(12) United States Patent
Keeton et al.

(10) Patent No.: US 7,426,616 B2
(45) Date of Patent: Sep. 16, 2008

(54) METHOD FOR DETERMINING A RECOVERY SCHEDULE

(75) Inventors: Kimberly Keeton, Palo Alto, CA (US);
Dirk Beyer, Walnut Creek, CA (US);
Ernesto Brau, Palo Alto, CA (US); Arif
Merchant, Palo Alto, CA (US);
Cipriano Santos, Palo Alto, CA (US);
Alex Zhang, San Jose, CA (US)

(73) Assignee: Hewlett-Packard Development
Company, L.P., Houston, TX (US)

( * ) Notice: Subject to any disclaimer, the term of this
patent is extended or adjusted under 35
U.S.C. 154(b) by 246 days.

(21) Appl. No.: 11/508,102

(22) Filed: Aug. 22, 2006

(65) Prior Publication Data
US 2008/0126279 A1    May 29, 2008

(51) Int. Cl.
*G06F 12/00* (2006.01)
(52) U.S. Cl. ..................................... 711/161
(58) Field of Classification Search .............. 711/161, 711/162
See application file for complete search history.

(56) References Cited

U.S. PATENT DOCUMENTS

| | | | |
|---|---|---|---|
| 5,420,917 | A | 5/1995 | Guzman |
| 5,778,387 | A | 7/1998 | Wilkerson et al. |
| 6,078,659 | A | 6/2000 | De Trana et al. |
| 6,754,855 | B1 | 6/2004 | Denninghoff et al. |
| 6,781,706 | B2 | 8/2004 | Sidorowich |
| 6,826,707 | B1 * | 11/2004 | Stevens ................. 714/2 |
| 6,859,796 | B1 | 2/2005 | Seward |
| 6,880,110 | B2 | 4/2005 | Largman et al. |
| 6,882,989 | B2 | 4/2005 | Stevens |
| 2006/0053178 | A1 * | 3/2006 | van Ingen et al. .......... 707/204 |

* cited by examiner

Primary Examiner—Hiep T Nguyen

(57) ABSTRACT

Provided is a method for determining a recovery schedule. The method includes accepting as input a recovery graph. The recovery graph presents one or more strategies for data recovery. In addition, at least one objective is provided and accepted. The recovery graph is formalized as an optimization problem for the provided objective. When formalized as an optimization problem, at least one solution technique is applied to determine at least one recovery schedule.

20 Claims, 12 Drawing Sheets

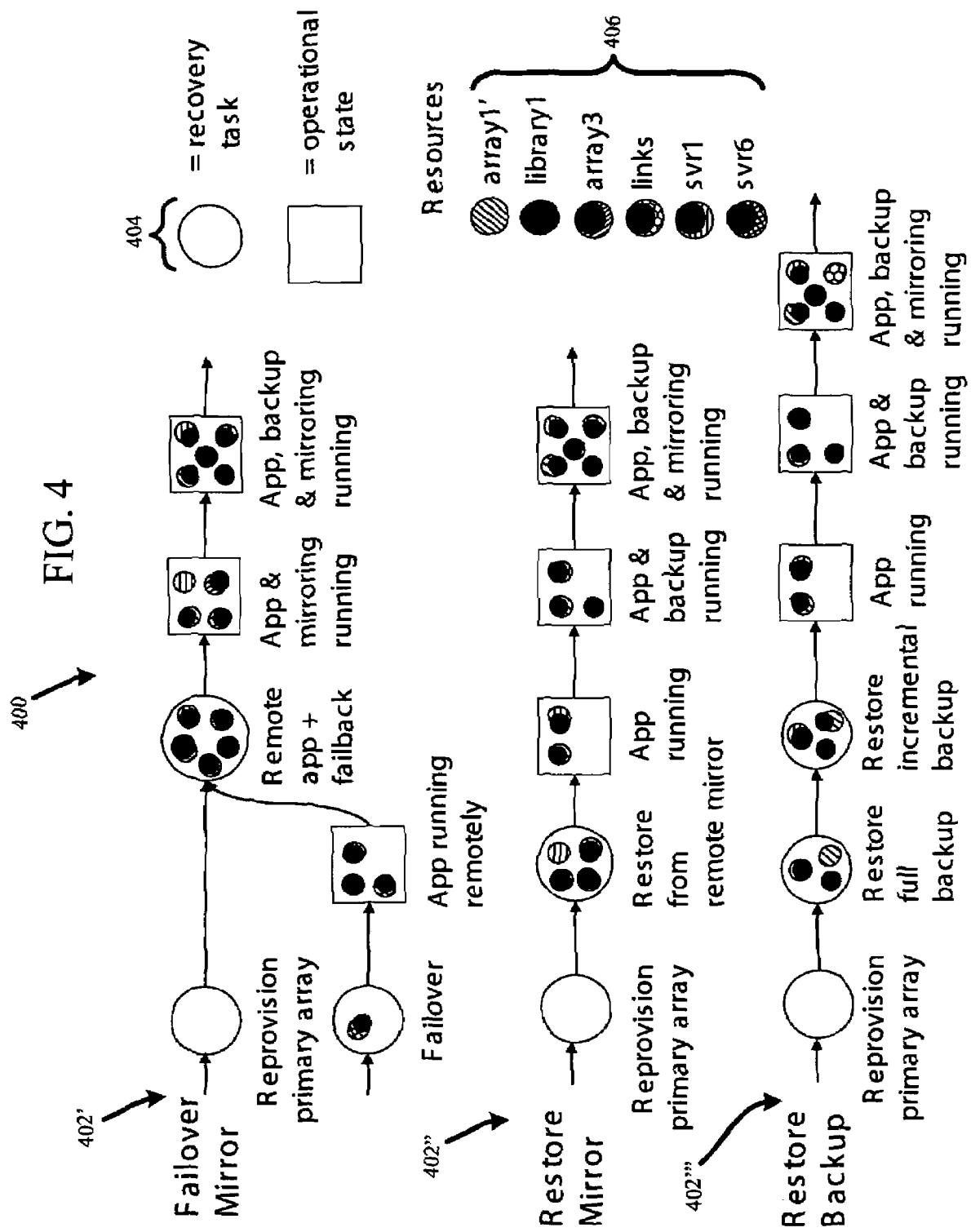

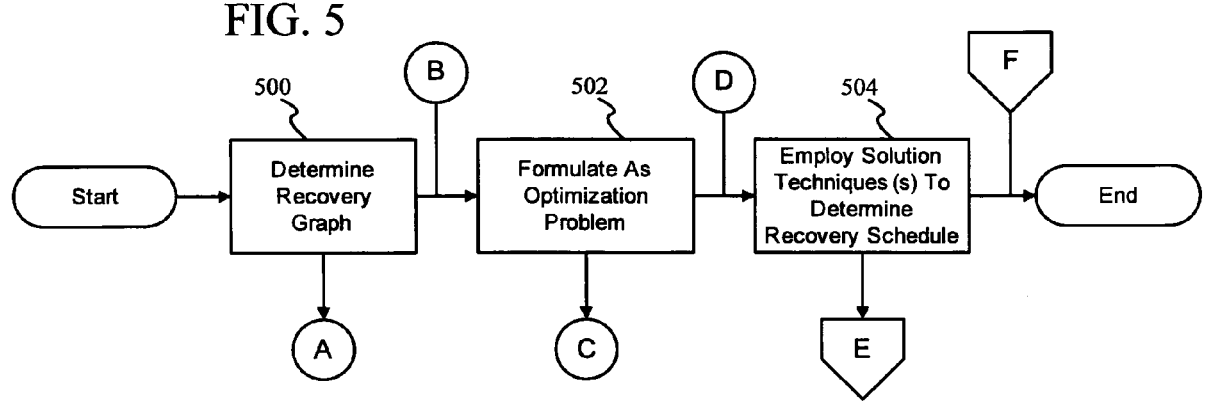
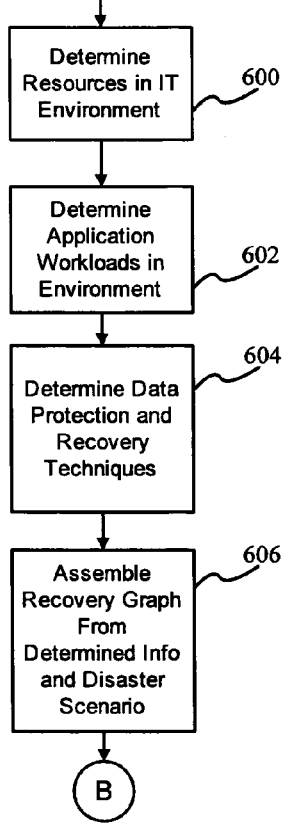
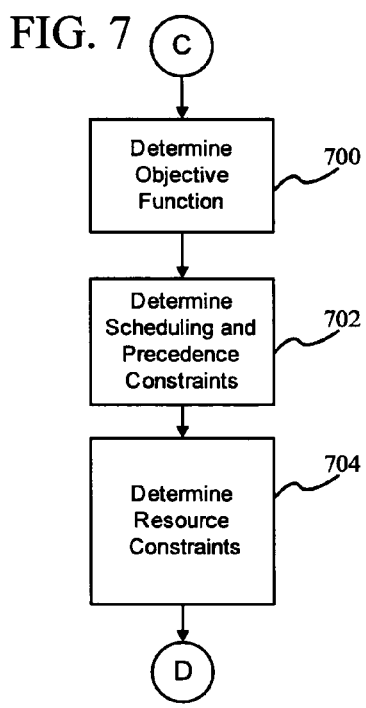

FIG. 18

OBJECTIVE FUNCTION

Minimize: $\sum_j \pi_{out,j} \cdot \sum_t t \cdot s_{j,t} + \sum_w \sum_p \pi_{loss,p} \cdot z_{w,p} +$ $$\sum_j \pi_{vul,j} \cdot \left( \sum_t t \cdot s_{S(j),t} - \sum_t t \cdot s_{j,t} \right) \quad (1)$$

CONSTRAINTS

$$\sum_p z_{w,p} \cdot V_{w,p} = 1 \quad \forall w \quad (2)$$

$$y_j = \sum_w \sum_p Q_{p,j} \cdot z_{w,p} \cdot V_{w,p} \quad \forall j \quad (3)$$

$$\sum_t s_{j,t} = y_j \quad \forall j \quad (4)$$

$$\sum_t e_{j,t} = y_j \quad \forall j \quad (5)$$

$$\sum_{\tau=1}^{t} s_{j,\tau} \geq \sum_{\tau=1}^{t} e_{j,\tau} \quad \forall j, t \quad (6)$$

$$\sum_{\tau=1}^{t} s_{j,\tau} \leq \sum_{\tau=1}^{t} e_{j,\tau} \quad \forall j, i \in P(j), t \quad (7)$$

$$e_{j,\tau} = s_{j,\tau-D_j}$$
$$\forall j \in J_{rec}, t, \tau = t+D_j, t+D_j+1, \ldots, T \quad (8)$$

$$e_{j,t} = s_{j,t} \quad \forall i \in J_{oper}, j \in S(i), t \quad (9)$$

$$e_{j,t} = \begin{cases} y_j & t = T \\ 0 & \text{otherwise} \end{cases} \quad \forall j \in J_{fin}, t \quad (10)$$

$$r_{j,t} \geq \sum_{\tau=1}^{t} s_{j,\tau} + \sum_{\tau=t+1}^{T} e_{j,\tau-1}$$
$$\forall j, t = 1, 2, \ldots, T-1 \quad (11)$$

$$r_{j,t} \leq \sum_{\tau=1}^{t} s_{j,\tau} \quad \forall j, t = 1, 2, \ldots, T-1 \quad (12)$$

$$r_{j,t} \leq \sum_{\tau=t+1}^{T} e_{j,\tau} \quad \forall j, t = 1, 2, \ldots, T-1 \quad (13)$$

$$\sum_j R_{j,m} \cdot r_{j,t} \leq K_{m,t} \quad \forall m, t \quad (14)$$

| Parameter | Notation | Units | Description |
|---|---|---|---|
| Indices | | | |
| workloads | w ∈ W | | set of workloads in the recovery graph |
| paths | p ∈ P | | set of paths in the recovery graph (i.e., across all workloads) |
| jobs | j, i ∈ J | | set of jobs (tasks) in the recovery graph (e.g., across all paths) Jobs are categorized as recovery tasks (Jrec), operational states(Joper) or final Jobs (Jfin). |
| time slots | t ∈ T | | set of fixed-duration time slots in the schedule |
| devices | m ∈ M | | set of device (e.g., "machine") instances |
| input parameters | | | |
| data outage penalty time | $\pi_{out,j}$ | US $/hour | outage penalty rate for job j. We observe the convention that this penalty rate is non-zero for the first job where an application is resumed, and zero otherwise. |
| data loss penalty | $\pi_{loss,p}$ | US $ | penalty for recovery path p, which corresponds to the product of data loss penalty rate times the recent data loss for path p |
| data vulnerability penalty rate | $\pi_{vul,j}$ | US $/hour | vulnerability penalty rate for job j. We observe the convention that this penalty rate is non-zero for jobs where an application is resumed, but its entire set of data protection workloads has not yet resumed; it is zero, otherwise. |
| recover path validity | $V_{w,p}$ | | binary indicator of whether a recovery path p is associated with a workload w |
| recover path membership | $Q_{p,j}$ | | binary indicator of whether a job j is associated with a recovery path p |
| precedence constraints | $I_{j,i}$ | | binary incidence matrix indicating job precedence constraints (j precedes i). The associated graph must be acyclic. |
| predecessors | $P(j) \subset J$ | | predecessors of job j, defined as the set of jobs that immediately precede job j (i.e., where $I_{i,j} = 1$) |
| successors | $S(j) \subset J$ | | successors of job j, defined as the set of jobs that immediately follow job j (i.e., where $I_{j,i} = 1$). We assume there is at most one successor per job. |
| device capacity | $K_{m,t}$ | bytes/sec | total resource capacity available at device m |
| resource requirements | $R_{j,m}$ | bytes/sec | resource requirements for job j on device m |
| job allocation duration | $D_j$ | sec | duration of job j |
| Decision variables | | | |
| chosen path | $z_{w,p}$ | | binary indicator variable showing whether path p is chosen for workload w |
| chosen job | $y_j$ | | binary indicator describing whether job j is chosen |
| start time indicator | $s_{j,t}$ | | binary indicator describing whether job j starts in time slot t |
| end time indicator | $e_{j,t}$ | | binary indicator describing whether job j ends in time slot t (i.e., first slot where resources are released) |
| resource indicator | $r_{j,t}$ | | binary indicator describing whether job j consumes recourse in time slot t |

METHOD FOR DETERMINING A RECOVERY SCHEDULE

FIELD OF THE INVENTION

The present invention relates generally to the field of disaster recovery for computer systems.

BACKGROUND

Data and applications utilizing data form a fundamental base for a multitude of activities in everyday life, such as banking records, travel itineraries, shipping schedules, and medical records.

Despite advances in performance longevity of computer systems and network elements, events can and will occur that will disrupt operation. For example, floods, fires earthquakes and storms are all natural disasters that in recent times have resulted in the loss of computer systems and their data. Of course disasters are not restricted to events of nature. Anything that leads to loss of data or loss of access to the data may be considered a disaster. For example, computer viruses, power surges, human errors, software malfunctions, and component failures are also relatively common events that can and do plague computer systems.

When critical data and applications are involved, it is now common to employ a variety of different data protection and recovery methodologies. Generally speaking, "recovery" is viewed as the restoration of the system through the use of copied data. Recovery may employ reconstruction of the system from the copied data, a switch to a mirror system (e.g., a failover), and/or combinations of different processes utilizing the copied data.

A primary copy of data is protected by making one or more secondary copies of data on the same or separate hardware, such as other disk arrays, a tape library, optical storage, memory banks, or even paper printouts. As used herein, the term secondary copy is understood and appreciated to refer to all data (i.e., application binaries, application metadata and user data) utilized by a functioning system. To ensure survival of the primary copy, there may even be local copies (e.g., a redundant disk array on site) as well as remote copies (e.g., a tape warehoused in a secure vault). There may also be copies that are currently up-to-date and copies that represent specific points in past time.

When a system or application is lost, for whatever reason, more often than not there are associated financial penalties. Especially with business systems, such penalties may include penalties for downtime, penalties for loss of most recent updates, penalties for vulnerability to subsequent failures during the recovery effort, and or other such penalties.

Many factors influence how fast recovery is performed, how complete the recovery is, and how reliable the restored system will be. Available bandwidth, shipping time from offsite storage locations, and other factors may affect the speed of recovery. In the event of data corruption, up-to-date copies may provide less recent data loss, but may include the same virus or elements that resulted in the data corruption, whereas an older copy made prior to the virus infection may provide a clean, but less up-to-date, system. Moreover, in many settings there is a choice between restoring from a local copy that might not be up-to-date, or a remote copy that is very current but expensive to transfer.

When faced with a need to determine a recovery schedule in the face of a disaster, system administrators often use rules of thumb, such as serializing recovery of workloads and data based on criticality to the business at hand. So as to minimize the chaos likely to ensue after a disaster, many businesses institute disaster recovery plans or business continuity plans. These plans describe what steps to take after a disaster and who the responsible parties are for each step. Recovery plans centralize information from a variety of disparate sources about the structure of the information technology system and how to recover the system.

These recovery plans are designed ahead of time and thoroughly tested to ensure that the personnel are familiar enough with the plans and procedures to be able to execute them smoothly during a time of high stress and emotion. This process is a lengthy one. Updating a recovery plan because of a change in system hardware or location, changes in the business requirements, changes in the service providers, or other major or minor changes affecting the overall system is often not an easy task.

Teams generally develop a collection of plans, each tailored to respond to the most likely disasters. Developed in advance and for a general disaster, these plans, if implemented, may not specifically address the current needs and requirements of the business, let alone the nature of the disaster at issue. The traditional methods for revisions to these pre-existing plans may well require time that is not available, or at the very least time that increases penalty costs for the delay in achieving the recovery.

Various guides are commercially available to offer rules of thumb and high-level guidance for the design of dependable storage systems and various methods for recovering the dependable storage system in the event of a disaster. However, these books typically focus mainly on the logistical, organizational and human aspects of disaster recovery, such as the need for a documented disaster recovery plan, the information it should contain, the need to maintain a list of critical personnel, and other such information. More specifically, these guides do not cover recovery of a system in any sufficient detail to be of practical use in an actual disaster recovery operation.

Hence, there is a need for a method to determine a recovery schedule for recovering data, such as from dependable storage, that overcomes one or more of the drawbacks identified above.

BRIEF DESCRIPTION OF THE DRAWINGS

FIG. 4 is a recovery graph for an application in accordance with an embodiment;

FIG. 5 is an enhanced flow diagram of a method of determining a recovery schedule in accordance with an embodiment;

FIG. 6 is a flow diagram for the determination of a recovery graph in accordance with an embodiment;

FIG. 7 is a is a flow diagram of the formulation of the recovery graph as an optimization problem in accordance with an embodiment;

FIG. 18 presents a table and equations for the mixed integer programming solution technique in accordance with an embodiment.

DETAILED DESCRIPTION

Before proceeding with the detailed description, it is to be appreciated that the present teaching is by way of example only, not by limitation. The concepts herein are not limited to use or application with a specific system or method for determining a recovery schedule for recovering data from dependable storage. Thus, although the instrumentalities described herein are for the convenience of explanation, shown and described with respect to exemplary embodiments, it will be appreciated that the principles herein may be applied equally in other types of systems and methods involving determining recovery schedules.

Figure 1:
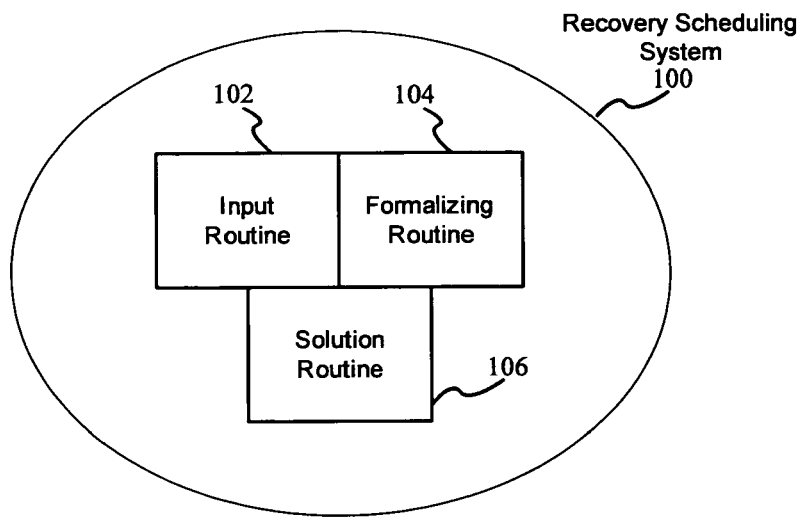
FIG. 1 is a high level block diagram of the recovery scheduling system in accordance with an embodiment.

FIG. 1 is a high level block diagram of the computer program architecture for a recovery scheduling system 100 in accordance with at least one embodiment. Recovery scheduling system 100 may be implemented on a computer having typical components, such as a processor, memory, storage devices, and input and output devices. During operation, the recovery scheduling system 100 may be maintained in active memory for enhanced speed and efficiency. In addition, it may also be operated within a computer network and may utilize distributed resources.

Recovery scheduling system 100 is used to determine the best recovery schedule based upon user-provided criteria. More specifically, recovery scheduling system 100 is operable to compare and evaluate different recovery schedules in an automated fashion so as to derive the best recovery schedule for a given recovery scenario. As is further explained below, as recovery scheduling system 100 is utilized in real time to determine a schedule for a user specified event and a user specified objective, the recovery scheduling system 100 advantageously provides a specifically tailored recovery schedule.

As shown in FIG. 1, the recovery scheduling system 100 includes an input routine 102, a formalizing routine 104, and a solution routine 106. Each routine may be composed of additional subroutines; however, the generalized routines are shown for ease of discussion and illustration.

The input routine 102 is operatively associated with at least one input device for permitting a user to enter information such as a recovery graph presenting one or more recovery strategies for data recovery, and/or other information. Resource capabilities may be determined directly by the system and/or indicated by a user. In certain embodiments, the user may provide additional information as well, such as an objective function or penalty rates.

The formalizing routine 104 is operable to formalize the recovery graph as an optimization problem for the user-provided objective. To state it another way, in at least one embodiment, the formalizing routine 104 is operable to formalize the recovery graph into an optimization problem for the user-provided objective. It is of course understood and appreciated that additional information may be included in addition to the recovery graph in formalizing the optimization problem for the user-provided objective. The solution routine 106 is operable to apply at least one solution technique to the optimization problem to determine at least one recovery schedule.

Figure 2:
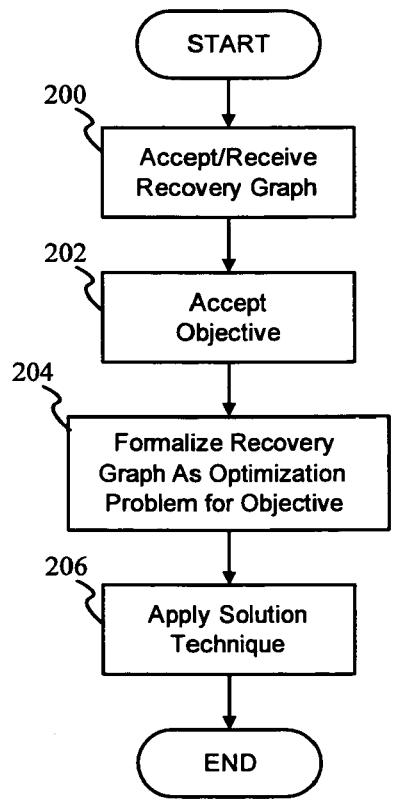
FIG. 2 is a flow diagram of a method of determining a recovery schedule in accordance with one embodiment.

FIG. 2 provides a high level flow diagram illustrating the method for determining a recovery schedule, in accordance with at least one embodiment. Specifically, a recovery graph is provided to or accepted by the recovery scheduling system 100, block 200. It is understood and appreciated that in at least one embodiment, the recovery graph is not a pictorial graph but is instead a logical construct represented within the recovery scheduling system 100. The recovery scheduling system 100 also accepts at least one objective for the recovery schedule, block 202.

This objective may be, for example, to restore the system as completely as possible with the least impact on systems unaffected by failure, or to restore the system as quickly as possible regardless of the effect on unaffected systems. Moreover, in at least one embodiment the objective is selected from the group of: minimizing financial penalties, minimizing recovery time, minimizing data loss, minimizing vulnerability to subsequent failure, minimizing disruption to unaffected workloads and/or non-failed application data sets, satisfying recovery time objectives, satisfying data loss objectives, and combinations thereof. Specifically, in at least one embodiment the objective is to minimize financial penalties.

In light of the provided objective, the recovery graph is formalized as an optimization problem focused upon the objective, block 204. Generally speaking, formalizing the recovery graph as an optimization problem includes at least two elements. The first is determining the precedence constraints for the recovery of each application dataset and reinstatement of the data protection workloads for each application dataset. The second is to determine the resource constraints, where the sum of the demands for a resource under a candidate schedule can not exceed the capabilities of the resource.

In addition, in at least one embodiment the optimization problem also received user-provided penalty rates, such as financial penalty rates. Financial penalties may be specified in various forms, such as specific dollar amounts per unit of time or data, or scaling factors. The penalty rates may be dependent upon which recovery alternatives are chosen, how long it takes to get the recovery started, and how long vulnerability is an issue. In one embodiment the penalty rate(s) are provided as elements within the recovery graph. In at least one alternative embodiment, the penalty rate(s) are provided independently. These penalty rates include, but are not limited to outage time penalties, loss penalties, vulnerability penalties and disruption penalties. Specifically, in at least one embodiment at least an outage time penalty rate is specified.

With such an optimization problem established, at least one solution technique is applied to the optimization problem so as to determine at least one recovery schedule, block 206. In at least one embodiment, the solution technique is selected from the group of: a mixed integer program with an off-the-shelf solver, a constraint program with an off-the-shelf solver, randomized algorithms, genetic algorithms, domain-specific heuristics, and combinations thereof. Specifically, in at least one embodiment where the problem is small enough to be solved exactly, the solver is an off-the-shelf solver applicable to solve mixed integer program formulations and determine an optimal answer.

In at least one embodiment, for each workload the optimized solution decomposes the problem into two parts—path selection and schedule determination. With respect to this two part decomposition, at least one solution technique as described above is applied to each part. Further the solution technique applied to path selection need not be the same solution technique applied to schedule determination.

For context to aid in the following description, FIG. 3 conceptually illustrates a recovery scheduling problem. As shown, Site 1 300 has suffered a disaster with respect to Array 1 302. The data present in Array 1 may be protected by a combination of techniques, such as snapshots, remote mirroring, tape backup and remote vaulting of tapes. Site 2 304, presents Array 3 306 as a mirror of Array 1 and a vault 308 storing tape backups.

Applications have associated penalty rates for outage duration, recent data loss, and vulnerability to additional failures. Four different recovery options are shown, e.g., restore from mirror, option 310, restore from backup, option 312, restore from vault, option 314, and failover 316 to remote mirror. Recovery is considered complete when the system is returned to the pre-failure state, specifically, all applications are back up and running at the original site and all data protection workloads are restored. Such a complete recovery involves restoration or failover and failback of application datasets and the reinstatement of data protection workloads for each application dataset. As used herein, application datasets are understood and appreciated to include application binaries, application metadata and user data. Moreover, the recovery of data is understood and appreciated to include application datasets, e.g., application binaries, application metadata and user data.

In the event of a failure that affects multiple applications, the application recovery operations will likely share resources. The sharing of resources may dictate a different choice of recovery operations. Moreover, the right decision is based upon an assessment of the issues of data loss, data recovery time and vulnerability. It is understood and appreciated that other embodiments may emphasize different recovery objectives.

Workflow management charts and graphs can provide abstractions for describing processes and their constituent activities, as well as relationships between activities, criteria for starting and terminating processes, and information about individual activities (e.g., required resource participants, associated applications and data). With respect to determining a recovery schedule, such a chart is termed a recovery graph.

A recovery graph captures different alternatives for recovering application datasets for a particular failure scenario. In at least one embodiment, providing a recovery graph for a disaster scenario is generally accomplished by determining the application workloads in a system environment requiring data recovery and the various recovery options that are available. More specifically, for each application workload and each recovery option that is available for that workload, the necessary recovery jobs, including explicit tasks and operational states, are determined, including their resource demands and ordering constraints. The resources within the environment, such as disk arrays, tape systems, mirror sites and the like, are determined, as well as their capabilities, such as available storage capacity and bandwidth.

It is also understood and appreciated that to achieve overall system recovery, in at least one embodiment, the recovery graph also includes paths for non-failed workloads, in addition to the workloads that were impacted directly by the failure and are in need of recovery. These non-failed workload paths include the steps of resuming (e.g., potentially stopping and re-starting) the application and the associated data protection workloads. The inclusion of non-failed workloads may be desired because in certain recovery situations it may be desirable to stop a low-priority unimpeded workload to permit a high-priority failed workload to recover.

Figure 3:
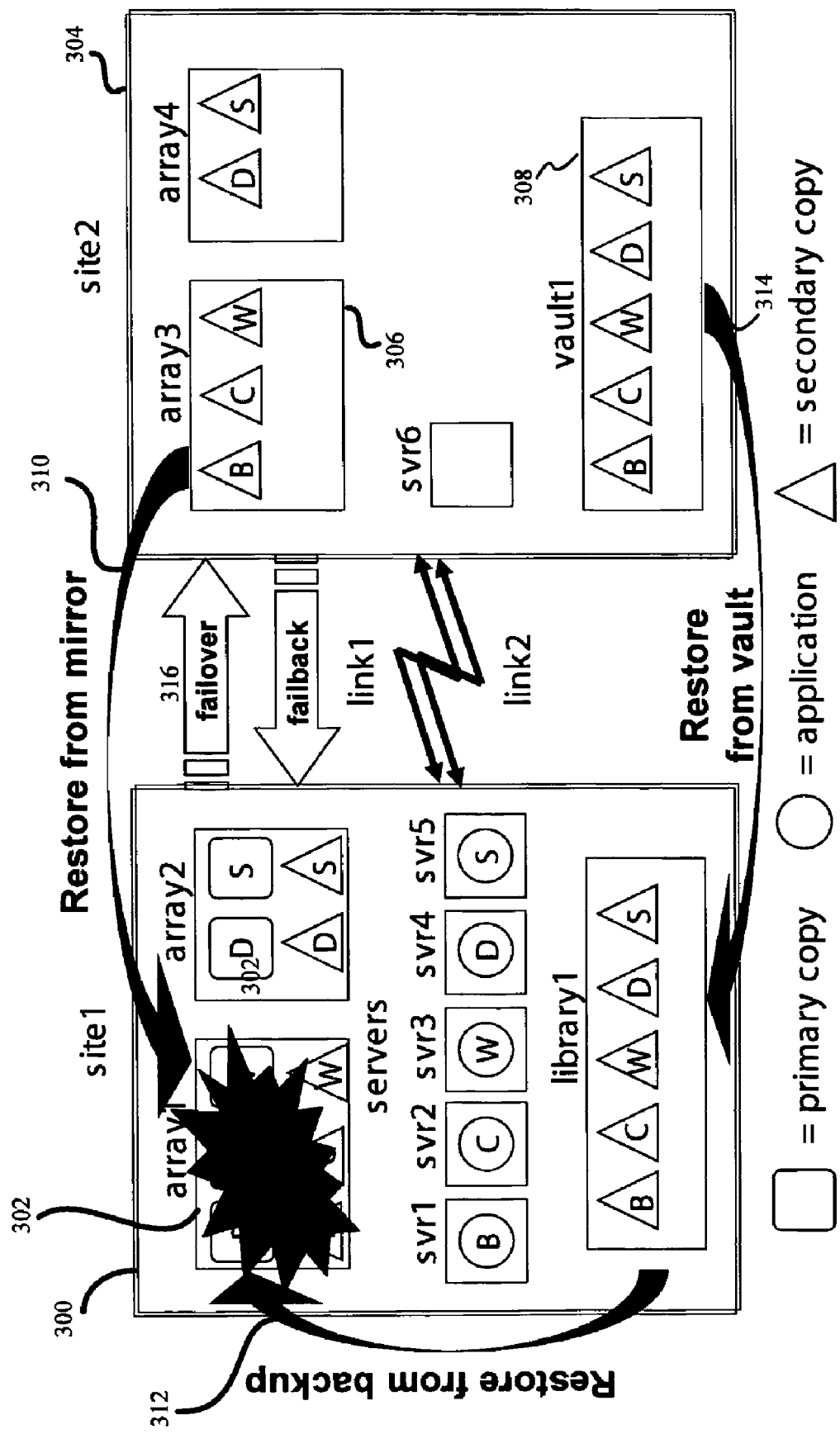
FIG. 3 is a schematic illustration of a computer system that has suffered a disaster.

FIG. 4 illustrates a recovery graph 400 for one application after a primary array failure shown in FIG. 3. Each recovery strategy (e.g., recovery from a secondary copy with a particular set of resources) is encoded as a path 402 in the recovery graph 400. It is understood and appreciated that the recovery graph 400 may contain multiple paths per application, depending on how the application's data was protected. For example, in FIG. 4 the paths correspond to failing over to a remote mirror system (FM) 402', restoring the dataset from a remote mirror (RM) 402'', and restoring from a backup copy (RB) 402'''.

As shown, each path includes at least one node 404, each node 404 indicating a recovery task or an operational state. Recovery tasks are represented as circles and operational states are represented as squares. A recovery task may be, for example, but is not limited to, "re-provision the primary array," "obtain a backup tape," "restore a full backup," "restore an incremental backup," etc. An operational state may be, for example but is not limited to, "application running," "application and mirroring running," "application and backup running," or "application and mirroring and backup all running."

Some tasks or states must be completed before others may start. For example, the reloading of data onto a failed array can only occur after the failed array has been replaced or fixed. Precedence constraints are represented by the order of the nodes 404, and more specifically the edges of nodes 404. Penalty rates may be indicated as annotations associated with each path, each node and/or resource. In addition, penalty rates may also be based on the start time of a task, the completion time of a task, the duration of the task and combinations thereof. In at least one embodiment, the penalty rates are associated specifically with each path and node.

Recovery operations demand resources. For example, in FIG. 4, each node 404 indicates at least one resource 406 demanded by the task or state. These resource demands are illustrated as circles within the node, the hatching distinguishing one resource from another. For storage devices, it is assumed that these resources correspond to device instances (e.g., recovery of a mirror copy can only proceed from the specific array holding that copy). For network and computational devices, a resource may be a specific instance or a virtual device corresponding to the aggregate capabilities of an underlying class of devices (e.g., a network with an aggregate bandwidth of 40 MB/s). As used herein, at least one resource may include simply the passage of time, such as for a recovery option requiring the ordering and arrival of a new array.

In at least one embodiment, resources may be shared between different workloads. Of course, one workload may dominate the use of a resource, including dominance to the exclusion of other workloads. Resources also have capabilities (e.g., bandwidth and capacity), which must be explicitly specified in order to permit enforcement of resource constraints.

Recovery tasks correspond to a fixed amount of work (e.g., restoring a full backup copy or re-provisioning a resource). The execution time depends on the allocation of resources required to accomplish the work. For example, restoring a one TB full backup using 60 MB/s of tape drive bandwidth will take about five hours. At 30 MB/s it would take about ten hours. For tasks that demand no resources other than time (e.g., overnight courier delivery of backup tapes from a remote vault), the execution time is modeled as a constant delay. After the work has been completed, the recovery can transition to the next node along the path.

Once application data has been restored, the application and its data protection workloads are eligible for resumption. Recovery graph nodes describe the operational states that recovery must pass through to restart all of these workloads. Each state's resource demands are typically initially set at the minimum level necessary to support the workloads that are active during that state. In at least one embodiment, if resources remain available for the period defined by a node, the level of use may be increased from the minimum level.

Representation of recovery alternatives as a recovery graph advantageously permits enhanced comparison and perception of the various options. Formalizing the recovery graph for interpretation by a computer for automated processing may be accomplished in several ways. For example, in at least one embodiment, the graph is established in a table, such as in an adjacency matrix.

In other words, in at least one embodiment formalizing the recovery graph involves generating a listing of the workloads, a listing of the paths for those workloads, a listing of the jobs for each path, a listing of the capabilities of the devices within the system, an adjacency matrix for the precedence relationships between jobs, a table that describes the resources required by each job and a listing of the penalty rates associated with paths, jobs and or combinations thereof.

With respect to the above description, at least one embodiment of the method for determining a recovery schedule for recovering data may be more fully appreciated with respect to the flow diagrams presented in FIGS. 5 through 16. It will be appreciated that the described method need not be performed in the order herein described, but that this description is merely exemplary of at least one preferred method of determining a recovery schedule for recovering data.

Figure 17:
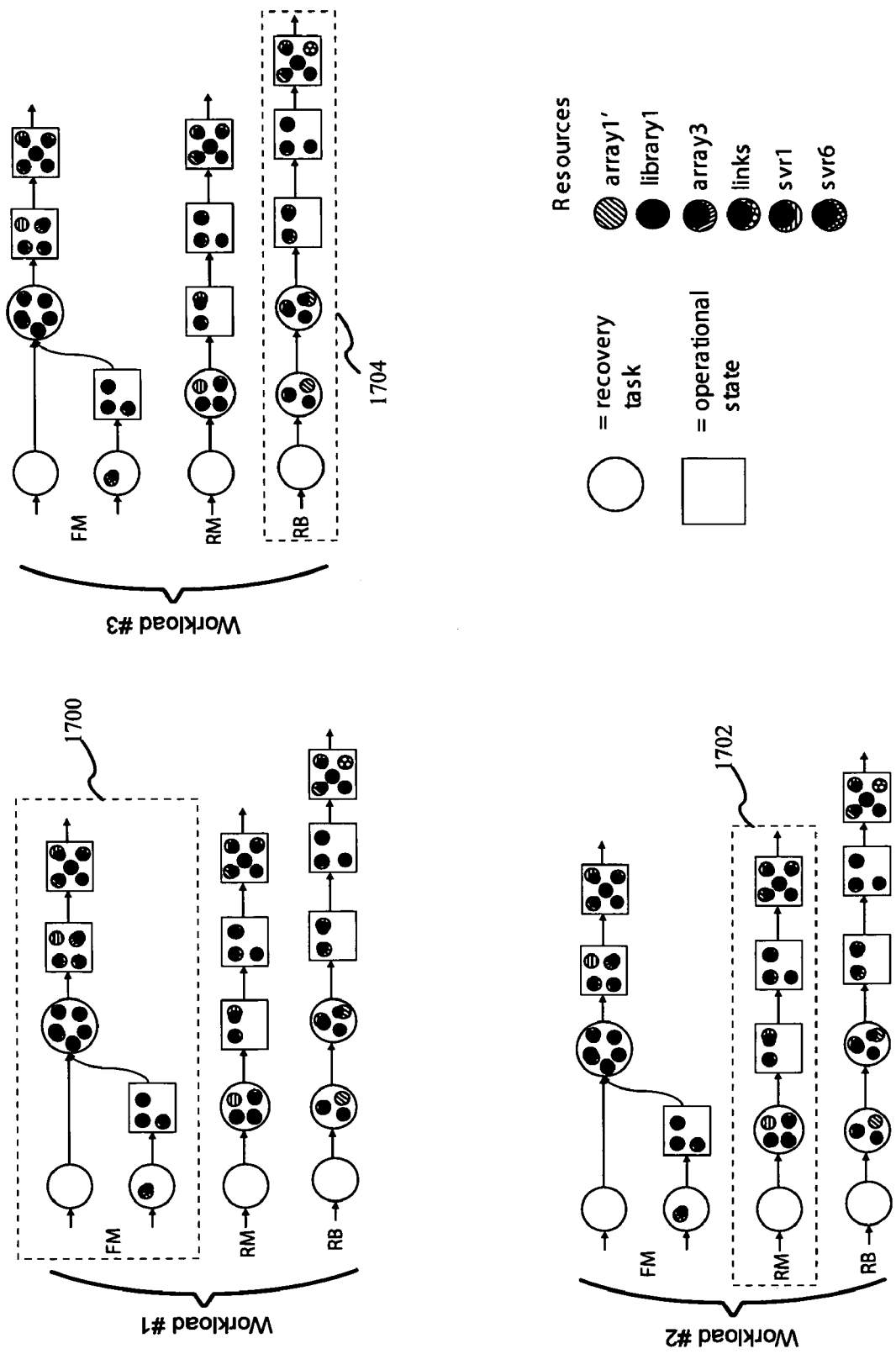
FIG. 17 is a recovery graph for three workloads in accordance with an embodiment.

FIG. 17 illustrates a recovery graph illustrating options for three application workloads, the paths for each being substantially identical to those presented above in connection with FIG. 4. To recover the system and restore each workload, a recovery path should be determined for each workload. The ultimate path selected for each workload is shown bounded by dotted lines 1700, 1702 and 1704. Each workload has been illustrated as having a different recovery path for the sake of description, however it is understood and appreciated that one or more workloads could have the same type of recovery path.

As shown in FIG. 5, the method is generalized with the following steps. First, determine the recovery graph, block 500. Second, formulate the recovery graph as an optimization problem, block 502. Third, employ at least one solution technique to determine a recovery schedule, block 504. With respect to the reference nodes, circles indicate references to flow diagrams provided on the same page (e.g., A, B, C and D), whereas the base indicates reference to flow diagrams provided on other pages (e.g., E and F).

Determining the recovery schedule, block 500, leads to FIG. 6, which more specifically recites this process. As shown, in at least one embodiment, the first action is to determine the resources available in the IT environment, block 600. The capabilities of the resources (e.g., bandwidth or capacity) are also determined for each resource. Second, the application workloads are determined, block 602. More specifically, for each application at issue, the associated business requirements such as data outage, recent data loss and data vulnerability penalty rates are assessed, as are the resource demands under normal, non-failure operation.

So as to indicate appropriate recovery path options, the types of data protection and recovery techniques available are also determined, block 604. For example, are there snapshots, backups or mirrored copies stored on local or remote storage devices? What is the frequency of each backup process? Is the copy incremental or complete? Is failover an option for recovering from a remote replica? What are the resource demands under normal, non-failure operation per data protection technique? Further, the tasks specific to each recovery technique are also identified, such as "courier in tapes from vault," or "acquire, install and format a new disk array."

With relevant information thus determined, the recovery graph is assembled, as in block 606. As the recovery graph is developed for a specific disaster scenario, certain recovery options may or may not be included. For each recovery option that is considered plausible, that option is represented as a path, as shown in FIG. 4.

To some degree, many of the elements desired for determining the recovery graph can and should be maintained and updated regularly, such as a current list of bandwidth and capacity for disk arrays, tape libraries and network links. Updating such records does not require a reformulation of a recovery graph, though as a practical exercise such may be performed from time to time.

With the recovery graph so determined, block 500, the recovery graph is formalized as an optimization problem, as in block 502 leading to FIG. 7. As shown in FIG. 7, in at least one embodiment, there are three parts to the formalizing process. The first is to determine the objective function, block 700. For example, is the objective to restore the system for the minimal cost without concern for time, or is the objective to restore the system as quickly as possible regardless of cost? Moreover, where the objective criteria are expressed as a common currency, such as money, the problem can be treated as an optimization problem with a single objective function. If on the other hand the objective criteria are not expressed as the common currency, then the problem will have multiple objective functions. In such a case, in at least one embodiment, application of the method will involve first optimizing for one set of criteria and then, given that partial solution, optimizing for the remaining criteria.

Next, the precedence constraints are determined, block 702. For example, installing and formatting a new disk array must precede loading data upon the new disk array. The resource constraints are also determined, block 704. As indicated in Block 600 of FIG. 6, the resources within the IT environment have already been determined. In formalizing the optimization problem it is important to ensure that the sum of all demands for a given resource must not exceed the resource's capabilities.

Having formalized the optimization problem in block 502, clarified by FIG. 7, the next step is to employ at least one solution technique to determine the recovery schedule, block 504. This operation is further illustrated in FIG. 8.

Figure 8:
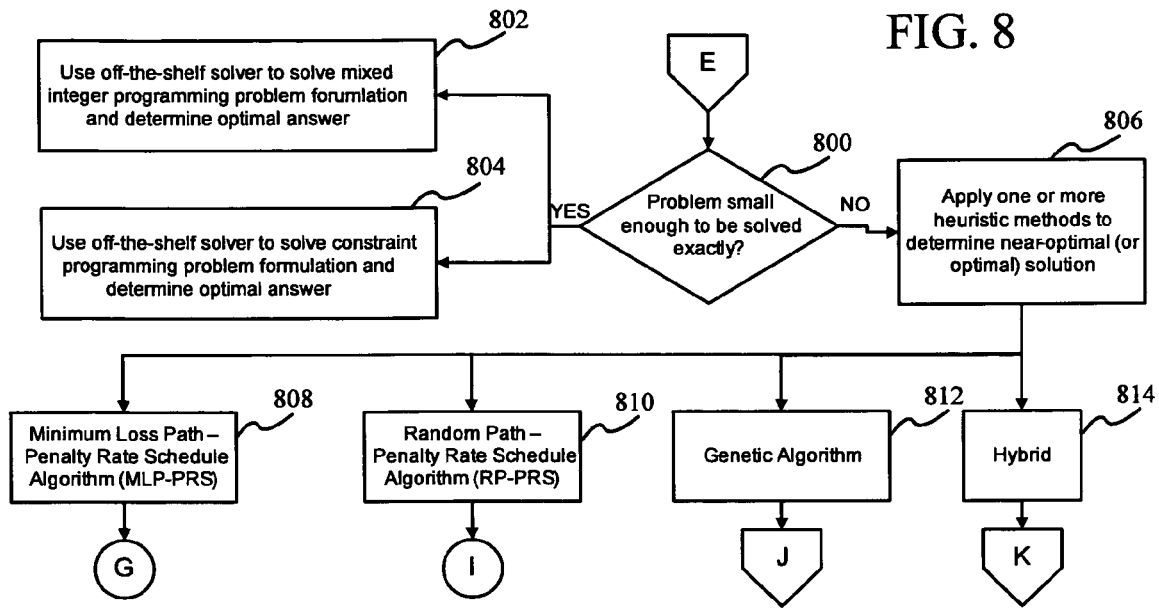
FIG. 8 is a flow diagram of the solution techniques in accordance with an embodiment.

In FIG. 8, the formalized problem is evaluated, decision 800. If the problem is small enough to be solved exactly (e.g., it is computationally reasonable to solve the problem exactly) an off-the-shelf solver is employed. In one embodiment this is an off-the-shelf solver utilized to solve a mixed integer problem formulation, as in block 802. In an alternative embodiment, this is an off the shelf solver utilized to solve a constraint problem formulation, block 804.

With respect to the mixed integer solution, block 802, the following example in connection with the chart and equations shown in FIG. 18 is provided. A workload's business requirements are represented by penalty rates for data outages ($\Pi_{out, j}$), data loss ($\Pi_{loss, p}$) and data vulnerability ($\Pi_{vul, j}$). From the recovery graph, the paths are represented as ($V_{w, p}$). Each path contains one or more jobs ($Q_{p,j}$), wherein the term job is understood and appreciated to encompass both recovery tasks and operational states. The graph also presents precedence constraints ($I_{j, i}$) for when job i cannot begin until job j has completed. (Predecessor and successor jobs are further described by P(j) and S(j), respectively.)

For each job, $R_{j,m}$ indicates the resources required for that task (e.g., the minimum bandwidth requirements for operational states or a minimum expected bandwidth allocation for the recovery tasks). Constraints will check to ensure that the sum of all resource demands for a given device do not exceed the capabilities of that device (e.g., $K_{m, t}$). $D_j$ describes the duration required for fixed work tasks. This duration may be a fixed delay (e.g., for provisioning resources or retrieving tapes from a remote vault), or it may be the time to perform work (e.g., to transfer incremental backup data from tape) at the requested bandwidth allocation level.

FIG. 18 presents a mixed integer programming (MIP) formulation according to one embodiment. The formulation's objective is to determine the solution that minimizes the overall penalties incurred by all workloads as quantified in Eq. 1. This solution includes a recovery path choice for each workload (e.g., $z_{w,p}$), the choice of the jobs along that path (e.g., $y_j$), and a schedule of jobs (e.g., indicated by a set of job start time indicators $s_{j, t}$).

Constraints govern the choices that can be made. For each workload, only a single recovery path can be chosen, and the chosen path must be associated with that workload (Eq. 2). All jobs on a workload's chosen path will be selected for execution (Eq. 3). Each job that is chosen for execution starts (Eq. 4) and ends (Eq. 5) only once. Jobs must start before they end (Eq. 6). The selected start times must satisfy the precedence constraints specified in the input recovery graph (Eq. 7).

Constraints also govern resource usage. A job's end time, as indicated by $e_{j,t}$, is used to track how long that job consumes resources. Jobs corresponding to recovery tasks consume resources until their work has been completed (e.g., for $D_j$, as shown in Eq. 8). Jobs corresponding to operational states consume resources until the next job begins for "intermediate" tasks (Eq. 9), and until the end of the schedule for the final job in the path (Eq. 10).

A job holds resources after it starts and before it ends (Eq. 11). It doesn't hold resources before it starts (Eq. 12) or after it ends (Eq. 13). For each device, the resource consumed must not exceed the device's capabilities (Eq. 14).

Returning to FIG. 8, if the evaluation of block 800 is that the problem is too large to be solved exactly (e.g., it is potentially computationally possible to solve the problem, however by the time such an answer is found it may be moot), then an approximate solution will be favored over an exact solution. To this end one or more heuristic methods may be used to determine a near-optimal, or perhaps even optimal, solution, block 806. In at least one embodiment the method is selected from the group of: a Minimum Loss Path-Penalty Rate Schedule (MLP-PRS) Algorithm, block 808, a Random Path-Penalty Rate Schedule (RP-PRS) Algorithm, block 810, a Genetic Algorithm, block 812, and a Hybrid Algorithm, block 814.

Figure 9:
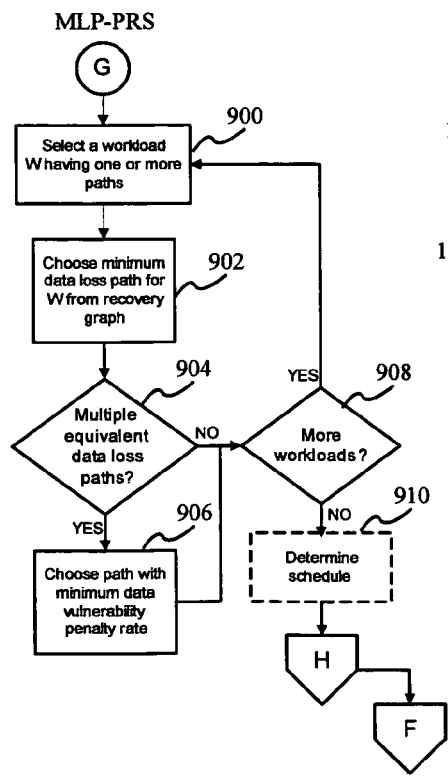
FIG. 9 is a flow diagram of a minimum loss path—penalty rate schedule algorithm (MLP-PRS) in accordance with an embodiment.

The MLP-PRS algorithm is further illustrated in FIG. 9. Specifically, for this solution algorithm, the solution technique commences with selecting a workload W having one or more paths, block 900. For the chosen workload W, the next operation is to choose the minimum data loss path for W, block 902. For example, switching to a mirror copy that is a few minutes older than the time of the disaster is generally preferable to obtaining a week old tape backup from a remote vault.

If there are multiple equivalent data loss paths to choose from, decision 904, the path with the minimum data vulnerability penalty rate is selected, block 906, before proceeding to the query as to whether more workloads remain, decision 908. If more workloads do indeed remain, the process returns to block 900 for an assessment of each additional workload. When all workloads have been assessed, the process moves to the determination of the schedule, block 910. As the determination of the schedule is a separate process, this action has been so indicated with a dotted line.

Figure 10:
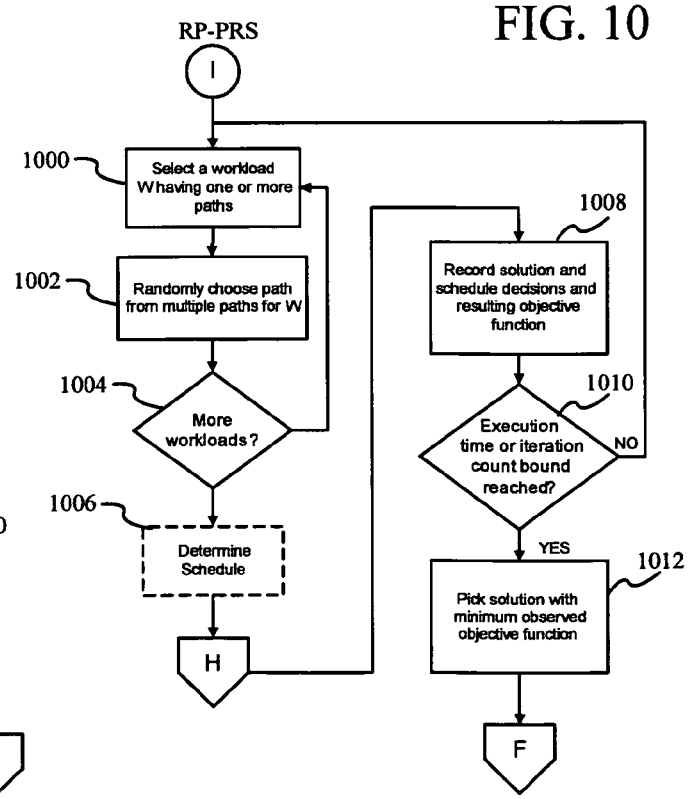
FIG. 10 is a flow diagram of a random path—penalty rate schedule algorithm (RP-PRS) in accordance with an embodiment.

The RP-PRS algorithm is further illustrated in FIG. 10. Specifically, for this solution algorithm, the solution technique commences with selecting a workload W having one or more paths, block 1000. With W selected, a path is randomly selected from the multiple paths for W, block 1002. If there are more workloads to be considered, decision 1004, the process returns to select another workload W, block 1000. After all workloads have been considered, and associated paths randomly selected, the process moves to determining the schedule, block 1006 shown in dotted line.

Upon returning from the scheduling subroutine, the candidate solution (e.g., each candidate is a selection of paths (one per workload) plus an overall schedule) and its objective function value are recorded, block 1008. With respect to the RP-PRS solution technique, a time period in which to search for a solution is typically indicated by the user. This may also be indicated by a number of iterations for the search. As in decision 1010, if time or iteration count limits have not been reached, the process will repeat and randomly select paths again for each workload. When the time or iteration count has been met or exceeded, a comparison is made of all candidate solutions as evaluated and the one with the minimum observed objective function is selected as the most desirable recovery path and schedule, block 1012.

Figure 11:
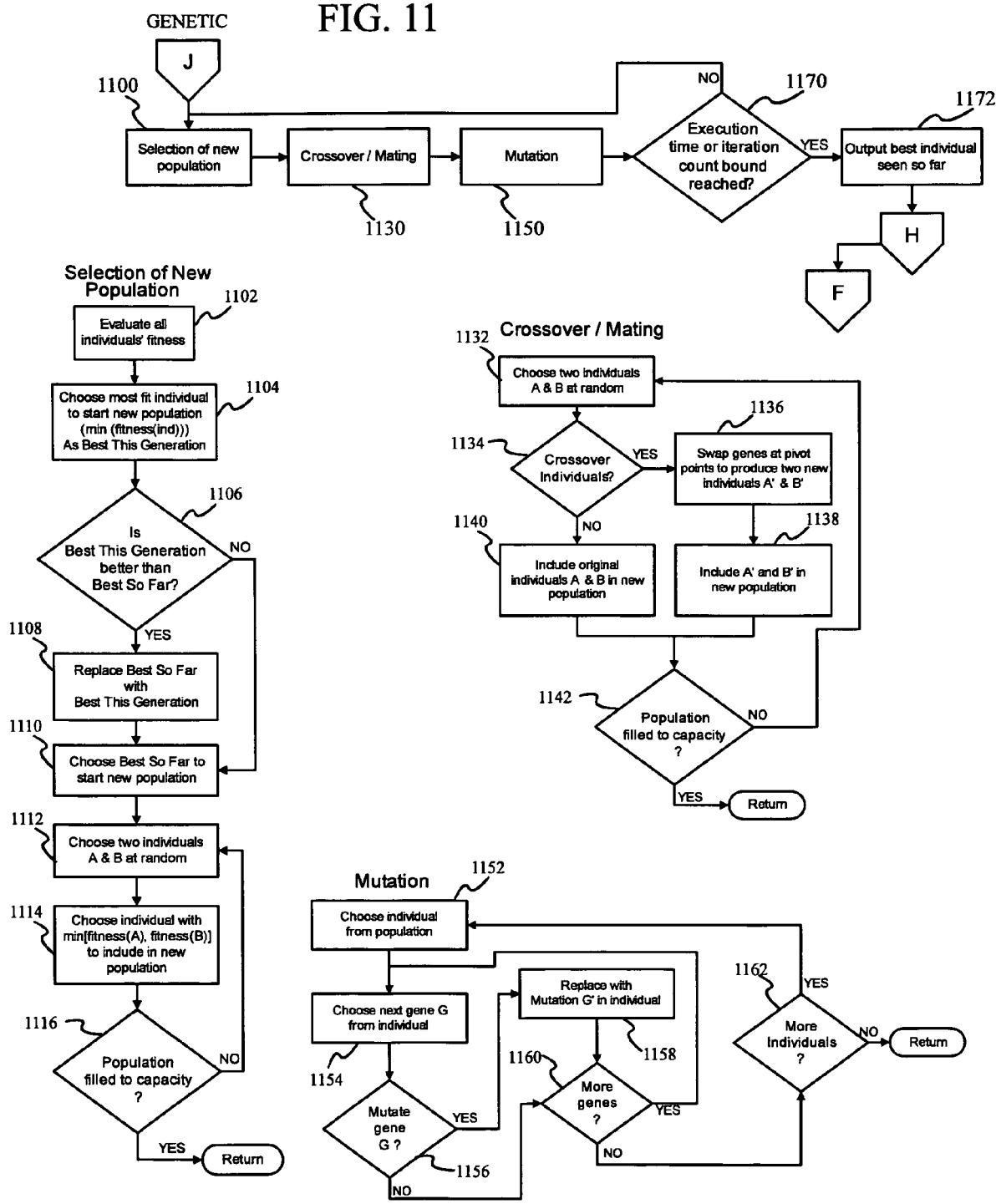
FIG. 11 is a flow diagram of a genetic algorithm in accordance with an embodiment

The genetic algorithm solution, block 812 in FIG. 8, is further illustrated in FIG. 11. As in the case of the RP-PRS, generally the user specifies time or iteration count limits for the solution technique to search for potential solutions. It is understood and appreciated that the genetic algorithm considers a set of candidate solutions that evolve over time based on a set of adaptations.

For example, the algorithm starts with the selection of a population, block 1100. Using a genetic metaphor, the individual is defined by a set of genes that correspond roughly to a vector of decision variables from the MIP formulation. With respect to the recovery schedule and the recovery graph, an individual may be defined as a set of path choices (one per workload), and a set of wait times (e.g., the time between the start of a job and the maximum end time of its predecessors) for each job along the chosen path.

For this example it is assumed that the maximum population is one hundred. In at least one embodiment, these one hundred individuals may be randomly chosen. In an alternative embodiment, the most fit individual observed so far (e.g., across all populations seen so far) is selected to start the new population, block 1110. Following this step, two additional individuals are chosen at random, block 1112. The individuals are compared by evaluating which candidate solutions are best using in one case the same fitness function used in block 1102. This function is analogous to the objective function in the mixed integer programming algorithm, and in at least one embodiment includes penalties for constraint violations. In particular the algorithm picks two individuals at random and applies the fitness function to determine the winner, block 1114 which is included in the population for the next iteration (e.g., the next generation). This process is repeated until the new population is filled, decision 1116.

With a new population determined, it now undergoes adaptations, such as crossover/mating, block 1130, and mutation, block 1150. With the crossover/mating, for each iteration, two individuals are selected at random, block 1132, and mated with a certain probability. In at least one embodiment this probability is 0.87. If mating occurs, decision 1134, the individuals swap genes to produce new individuals, block 1136. These new individuals are then included in a new population having the same size as the original population, block 1138. If no mating occurs, decision 1134, then the two original individuals matriculate to the new population, block 1140. The process is repeated until the new population is full, decision 1142.

Mating or crossing two individuals entails swapping a subsequence of genes, as defined by pivot points, which divide the genes into contiguous regions. In at least one embodiment, the crossover algorithm chooses the number of pivot points depending upon the number of application workloads in the recovery set, such as two for five workloads and ranging up to six for fifty workloads. In crossing or mating the individuals, the individuals exchange genes after the odd pivot points and keep the genes after the even pivot points. The algorithm may use two separate sets of pivot points, one set for path choice and one set for start time genes.

After the crossover/mating of block 1130, the genes of the individuals are subjected to mutation, block 1150. Mutation occurs with the selection of an individual, block 1152. From the genes present, one is selected, block 1154. The gene is then mutated with a certain probability. In at least one embodiment this probability is 0.04 per gene. If the mutation occurs, decision 1156, the original gene is replaced with the mutated gene, block 1158. If more genes are present for the individual, the process repeats, decision 1160.

If the gene mutation does not occur, the process moves directly to the evaluation of whether more genes still remain, decision 1160. When no further genes remain, the process moves to select another individual, decision 1162, with the cycle repeating until all individuals in the population have been processed.

To provide the greatest opportunity to derive an optimal solution, the execution time specified by a user is preferably greater than one iteration, such that a new population is selected, compared, and mutated from the entire population, including the individuals just so processed. In other words, each iteration provides a new generation through the act of selection, crossover and mutation. If there is still execution time remaining, the entire process may be run again, decision 1170. At the end of the execution time, the best individual is provided, block 1172. To permit the greatest chance of success, the genetic algorithm is typically repeated hundreds or thousands of iterations, to increase the fitness of the individuals (and hence the quality of the solution) through selection, mating and mutation.

It is understood and appreciated that, through the process of crossover/mating and mutation, these adaptations may lead to an individual that represents an infeasible solution because it violates one or more constraints. The algorithm can handle constraint violations by several methods, such as imposing a rigid definition for an individual, penalizing constraint violations in the fitness function, or repairing the gene to bring the individual into compliance, and or combinations thereof.

In at least one embodiment, each gene has the capacity to store the schedule for only a single path for each workload, thus satisfying the constraint that one path must be chosen for each workload. By specifying start times as a set of relative wait times, precedence constraints are automatically enforced. Resource capacity constraints may be handled by penalizing such violations by multiplying the magnitude of the violation by a constant (e.g., the largest penalty rate provided for the disaster recovery schedule). These penalties are then added to the fitness function, to discourage selection of unfit individuals, more specifically infeasible solutions.

Figure 12:
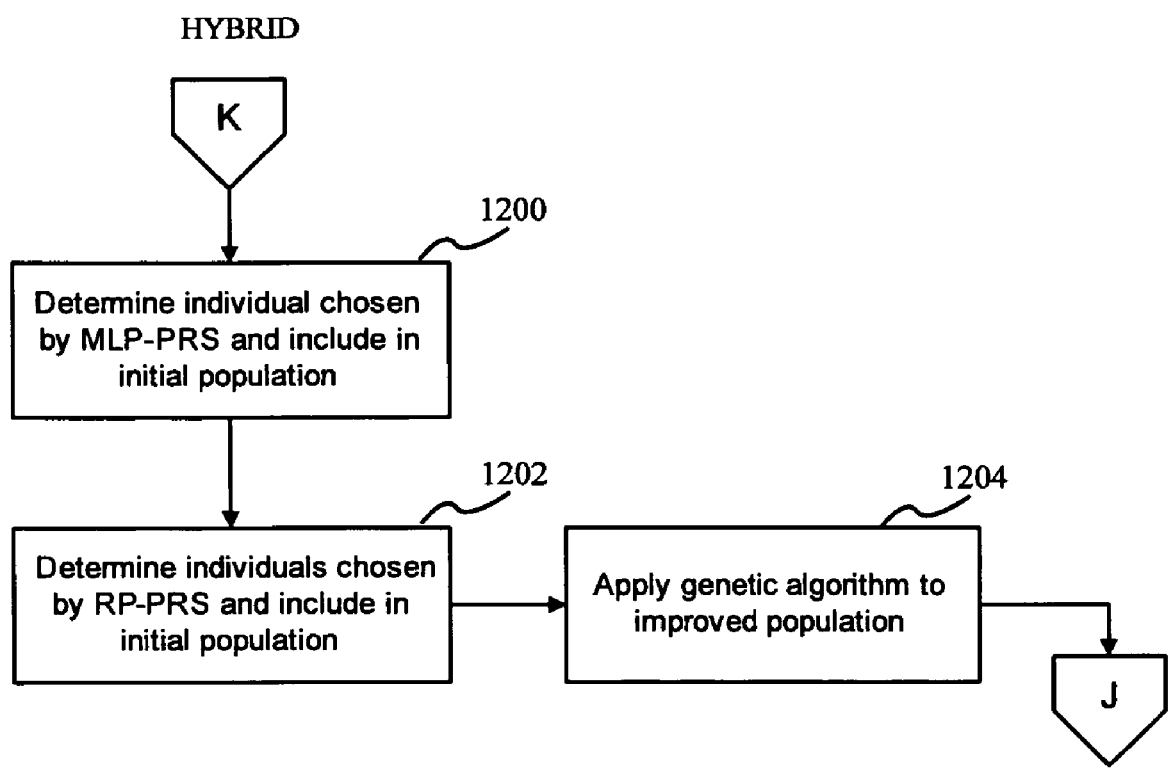
FIG. 12 is a flow diagram of a hybrid algorithm in accordance with an embodiment

The hybrid solution, block 814 in FIG. 8, is further illustrated in FIG. 12. The genetic algorithm may take a large number of iterations to evolve from an initial population of less fit individuals to a population of good individuals (e.g., strong solutions). This evolutionary process can be shortened if the fitness of the initial population is increased. To address this issue, in at least one embodiment the solution technique is a hybrid solution leveraging advantages of the MLP-PRS and RP-PRS heuristics to seed the initial population for the genetic algorithm.

More specifically, a strong individual is determined by the MLP-PRS, block 1200. The MLP-PRS is as shown in FIG. 9. To complete the initial population, the PR-PRS, block 1202, is repeated a sufficient number of times to identify enough strong candidates to complete the population. The RP-PRS is as shown in FIG. 10. The genetic algorithm, as shown in FIG. 11, is then applied to the improved population, block 1204.

Figure 13:
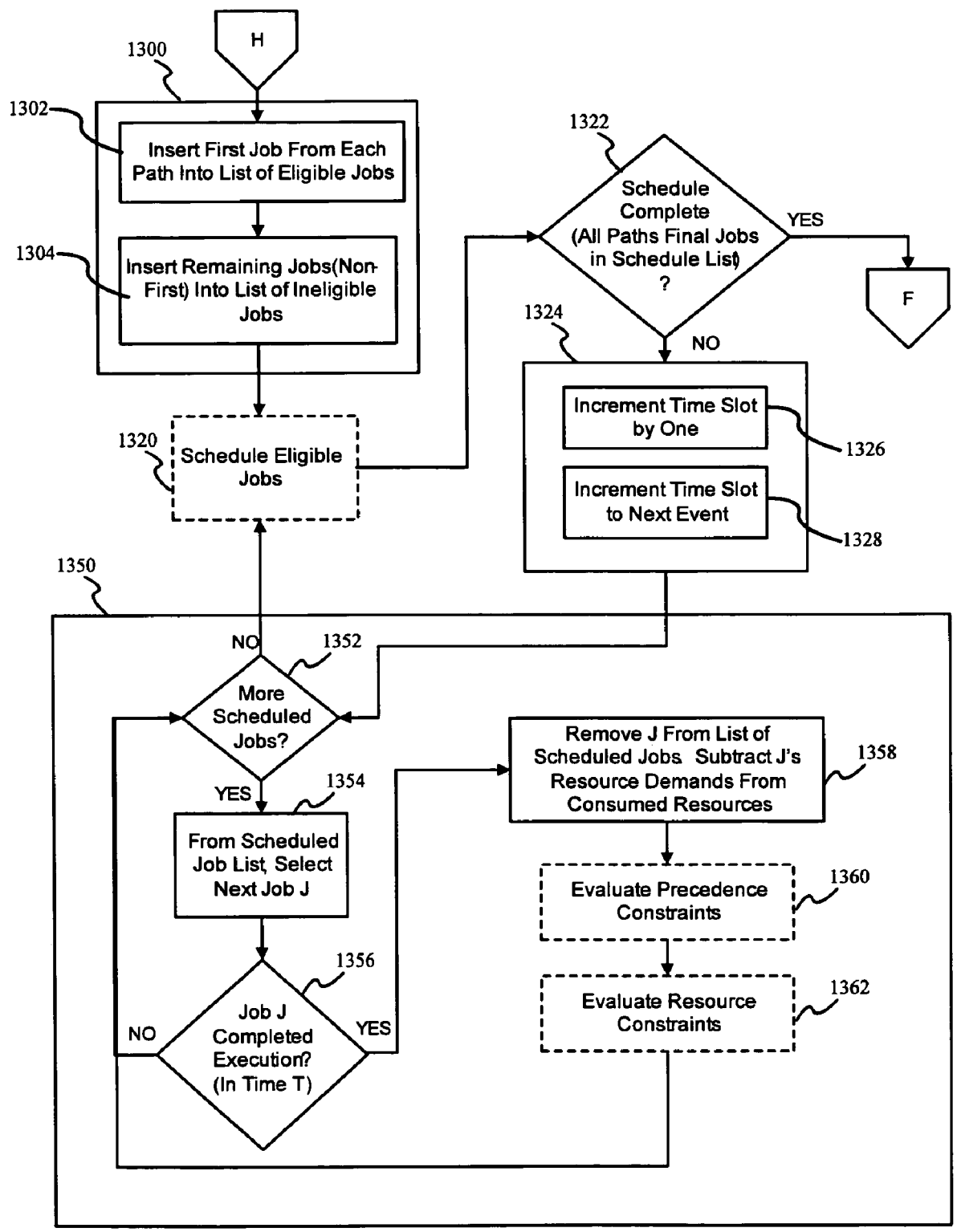
FIG. 13 is a flow diagram of the schedule determination based on findings of the solution technique in accordance with an embodiment.
Figure 14:
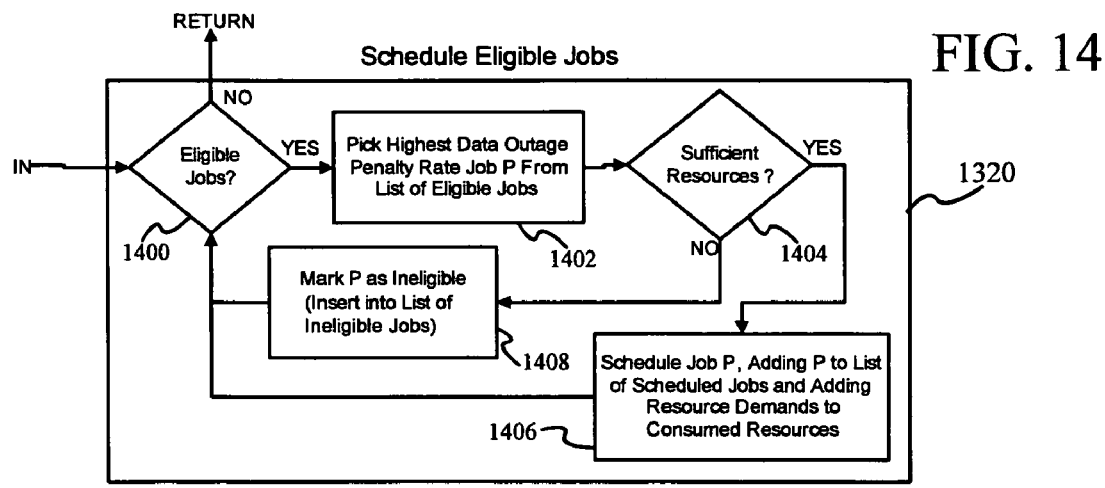
FIG. 14 is a flow diagram of the method of scheduling eligible jobs in accordance with an embodiment.
Figure 15:
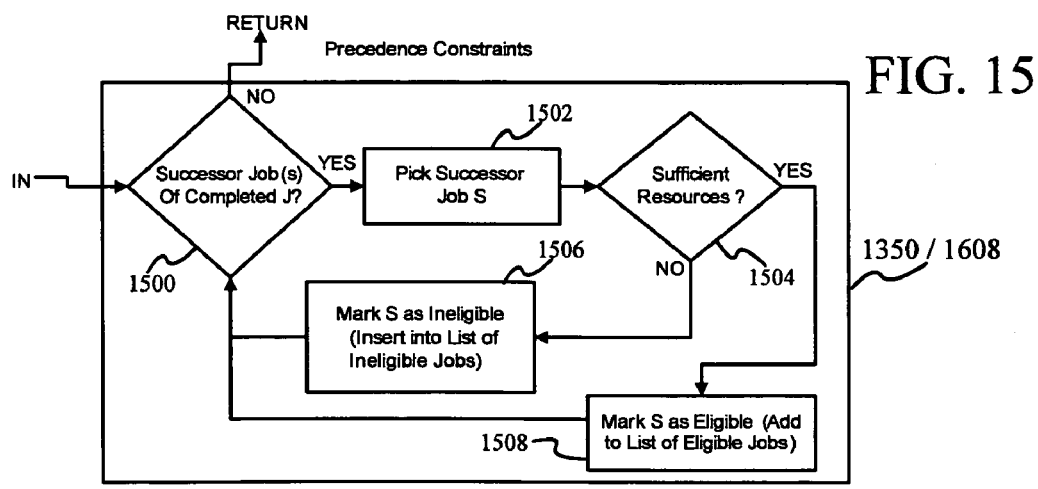
FIG. 15 is a flow diagram of the check for precedence constraints in accordance with an embodiment.
Figure 16:
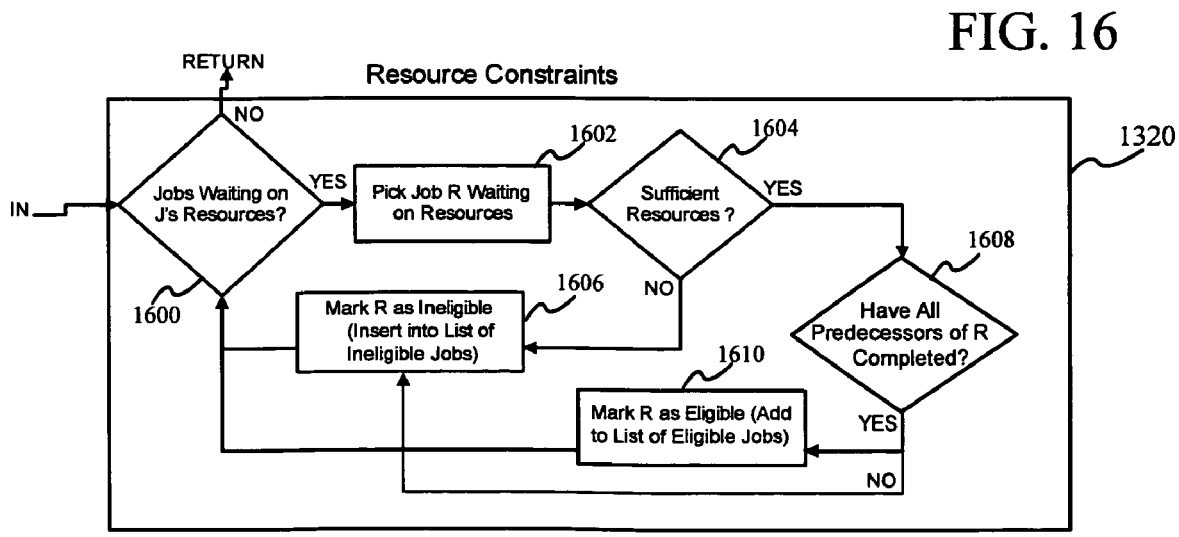
FIG. 16 is a flow diagram of the check for resource constraints in accordance with an embodiment.

FIG. 13 is a flow diagram, which in connection with FIGS. 14~16, illustrates at least one method of determining the schedule in accordance with at least one embodiment. The process may be summarized as commencing with initialization, block 1300, scheduling the initial jobs, block 1320, and determining subsequent eligible jobs to be scheduled in subsequent time slots, block 1350.

More specifically, the first job from each path is added to the list of eligible jobs, block 1302. Although the solution techniques described above identified a path for each workload, the presence of multiple workloads dictates that there are multiple paths to be scheduled. The remaining (non-first) jobs are then added to the list of ineligible jobs, block 1304.

The eligible jobs are then scheduled, block 1320. This scheduling operation is further illustrated in FIG. 14. Specifically, the list of eligible jobs is first queried to ensure that indeed there are eligible jobs present, decision 1400. With confirmation that eligible jobs are present, in one embodiment the job with the highest data outage penalty rate is selected from the list of eligible jobs, identified as job "P", block 1402. To properly schedule this job a query of the resources is performed, decision 1404.

If sufficient resources are present, the job P is scheduled by adding it to the list of scheduled jobs and further adding the resource demands to a list of consumed resources, block 1406. The process then returns to determine if more eligible jobs are present, decision 1400. If sufficient resources are not present, decision 1404, job P is marked as ineligible and added to the list of ineligible jobs, block 1408, and the process returns to the query of more eligible jobs, block 1400. When all eligible jobs have indeed been scheduled the process returns to the question of whether the schedule is complete, decision 1322.

For the first iteration, the answer will likely be no. As a result the interval of time is incremented, block 1324. In at least one embodiment wherein time is treated as a series of slots into which events are scheduled, the time slot is incremented, block 1326. In an alternative embodiment wherein time slots are measured against events, the time slot is incremented to the next event time, block 1328.

Initially, a query is performed to check whether there are more jobs that have already been scheduled, which may have completed execution, decision 1352. From the job list, a next job J is selected, block 1354. This job is then evaluated to determine if it has completed execution within the current time interval, decision 1356. If the answer is no, decision 1356, the method cycles back to determine if there are more scheduled jobs, decision 1352. If the answer is yes, decision 1356, job J is removed from the list of scheduled jobs and the resources are subtracted from the list of consumed resources, block 1358.

In addition, an evaluation of precedence constraints, block 1360, and resource constraints, block 1362 is also performed. The evaluation of precedence constraints, block 1360, is more fully illustrated in FIG. 15. Specifically, a query is performed to determine if there are successor jobs of completed job J, decision 1500. If the response is "No", precedence constraints are not at issue and the method returns to proceed with the evaluation of resource constraints, block 1362.

In response to a "Yes", a successor of job J is picked, Job S, block 1502. A query of the available resources is performed, decision 1504. If insufficient resources are available to execute job S, it is marked as ineligible and added to the list of ineligible jobs, block 1506. If sufficient resources are available, job S is marked as eligible and added to the list of eligible jobs for scheduling, block 1508. From either the eligible or ineligible listing, the method returns to query if more successor jobs are present, decision 1500.

The evaluation of resource constraints, block 1362, is more fully illustrated in FIG. 16. Specifically, a query is performed to determine if there are jobs waiting on the resources of job J, decision 1600. If the response is "No", the resource constraints are not at issue and the method returns to query if more scheduled jobs are present, decision 1352.

In response to a "Yes", a waiting job R is picked, block 1602. A query of available resources is performed, decision 1604. If insufficient resources are available to execute job R, it is marked as ineligible and added to the list of ineligible jobs, block 1606. If sufficient resources are available, the precedence constraints are evaluated, decision 1608. If all predecessors have been completed job R is then marked as eligible and added to the list of eligible jobs, block 1610, else job R is marked as ineligible, block 1606. From either the eligible or ineligible listing, the method returns to query if more jobs waiting on J's resources are present, decision 1600.

To briefly summarize, in at least one embodiment the method for determining a recovery schedule for recovering data is performed by providing a recovery graph, which is accepted as a representation of the recovery options for a disaster scenario. More specifically, the recovery graph presents one or more recovery options for each application, each represented as a path, with each recovery action represented as a node on the path. Relevant penalty rates are also obtained for each dataset. The resource demands for each recovery step of each recovery strategy for each application dataset are also obtained, and at least one objective for the recovery schedule is also obtained. This information may be entirely present within the recovery graph, or it may be provided separately from the recovery graph.

The graph and such additional information are then formalized as an optimization problem to meet the provided objective. This formalized optimization problem is then solved by applying at least one solution technique. In at least one embodiment, the optimized solution may decompose the problem into two parts, the selection of the path and the schedule determination.

Figure 19:
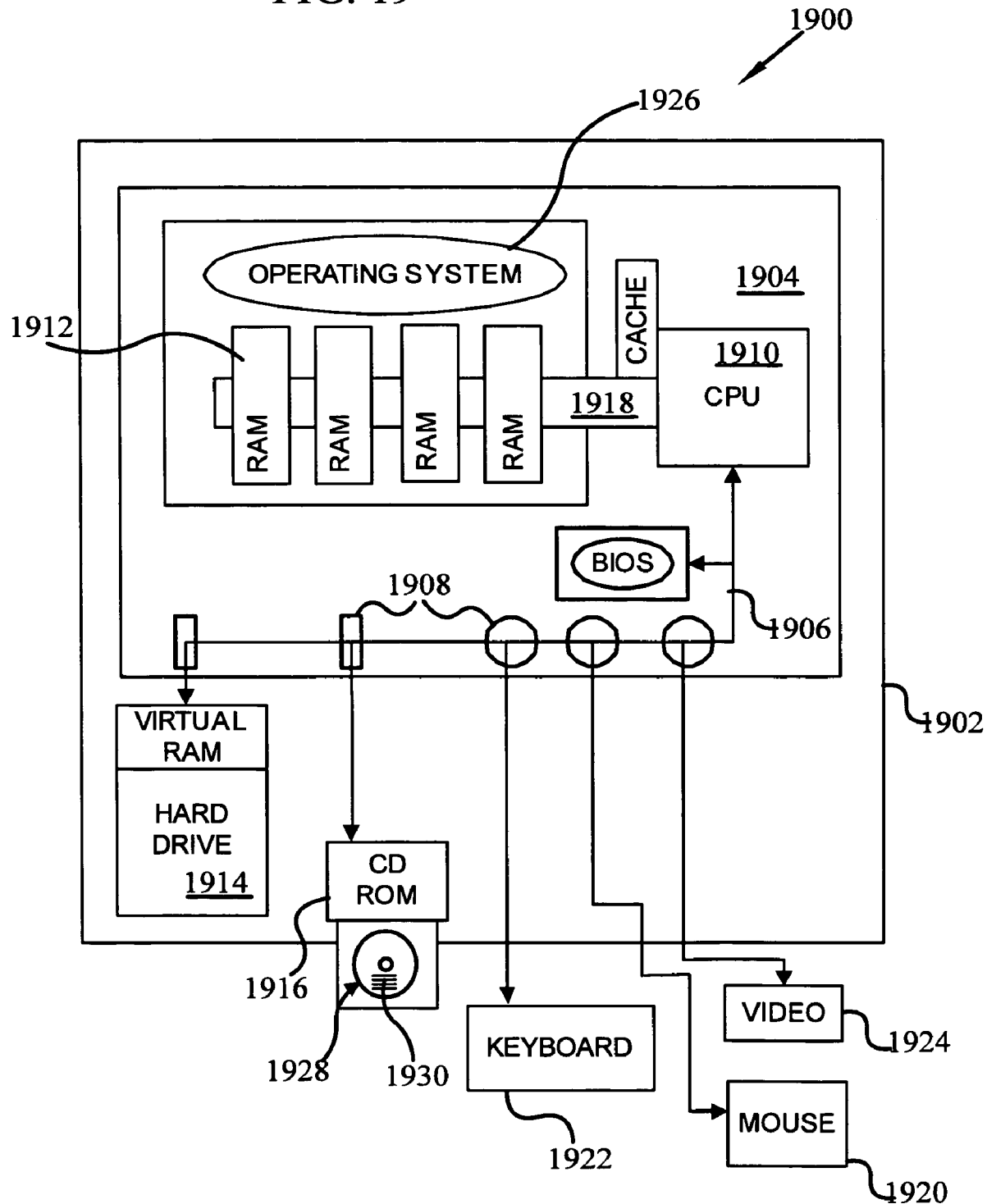
FIG. 19 is a block diagram of a computer system in accordance with one or more embodiments.

In at least one embodiment, the recovery scheduling system 100 is implemented as a computer system for scheduling activities. FIG. 19 is a high level block diagram of an exemplary computer system 1900. Computer system 1900 has a case 1902, enclosing a main board 1904. The main board has a system bus 1906, connection ports 1908, a processing unit, such as Central Processing Unit (CPU) 1910, and a memory storage device, such as main memory 1912, hard drive 1914, and CD/DVD Rom drive 1916.

Memory bus 1918 couples main memory 1912 to CPU 1910. A system bus 1906 couples hard drive 1914, CD-ROM/DVD drive 1916, and connection ports 1908 to CPU 1910. Multiple input devices may be provided, such as a mouse 1920 and keyboard 1922. Multiple output devices may also be provided, such as a video monitor 1924 and a printer (not shown).

Computer system 1900 may be a commercially available system, such as a desktop workstation unit provided by HP, IBM, Dell Computers, Gateway, Apple, Sun Micro Systems, or other computer system provider. Computer system 1900 may also be a networked computer system, wherein memory storage components such as hard drive 1914, additional CPUs 1910 and output devices such as printers are provided by physically separate computer systems commonly tied together in the network. Those skilled in the art will understand and appreciate that physical composition of components and component interconnections comprising computer system 1900, and select a computer system 1900 suitable for the schedules to be established and maintained.

When computer system 1900 is activated, preferably an operating system 1926 will load into main memory 1912 as part of the boot strap startup sequence and ready the computer system 1900 for operation. At the simplest level, and in the most general sense, the tasks of an operating system fall into specific categories—process management, device management (including application and user interface management) and memory management.

In such a computer system 1900, the CPU 1910 is operable to perform one or more of the recovery scheduling embodiments described above. Those skilled in the art will understand that a computer-readable medium 1928 on which is a computer program 1930 for adding activities to a schedule may be provided to the computer system 1900. The form of the medium 1928 and language of the program 1930 are understood to be appropriate for computer system 1900. Utilizing the memory stores, such as one or more hard drives 1914 and main system memory 1912, the operable CPU 1910 will read the instructions provided by the computer program 1930 and operate to perform the recovery scheduling system 100 as described above.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A method for determining a recovery schedule, comprising:
- accepting as input a recovery graph, the recovery graph presenting one or more recovery strategies for data recovery;
- accepting at least one objective for the recovery schedule;
- formalizing the recovery graph as an optimization problem for the objective; and
- applying at least one solution technique to the optimization problem to determine at least one recovery schedule.

2. The method of recovering data of claim 1, wherein each recovery strategy is a path within the recovery graph, each path including a series of nodes, each node indicating a recovery task or operational state, each node further indicating at least one resource demanded by the task or state, and precedence constraints represented by edges between the nodes.

3. The method of recovering data of claim 1, wherein the applied solution technique is selected from the group consisting of: mixed integer programming with an off-the-shelf solver, constraint programming with an off-the-shelf solver, randomized algorithms, genetic algorithms, domain-specific heuristics, and combinations thereof.

4. The method of recovering data of claim 1, wherein the objective of the optimization problem is selected from the group consisting of: minimizing financial penalties, minimizing recovery time, minimizing data loss, minimizing vulnerability to subsequent failure, minimizing disruption to unaffected workloads, satisfying recovery time objectives, satisfying data loss objectives, satisfying scheduling deadlines and combinations thereof.

5. The method of recovering data of claim 1, wherein an optimized solution decomposes the problem into two parts, a first part including path selection for each workload, and a second part including schedule determination for each selected path, the first part and the second part each having an applied solution technique.

6. The method of recovering data of claim 1, wherein the method is stored on a computer-readable medium as a computer program that, when executed by a computer, will perform the steps of determining at least one recovery schedule.

7. A method for determining a recovery schedule for recovering datasets from dependable storage, comprising:
- providing a recovery graph, the recovery graph presenting at least one recovery strategy for recovering application datasets, each recovery strategy represented as a path, each path including nodes, each node indicating a recovery task or operational state, each node further indicating at least one resource demanded by the task or state, precedence constraints represented by edges between the nodes;
- accepting at least one objective for the recovery schedule;
- formalizing the recovery graph into an optimization problem for the objective, the problem further receiving inputs, including penalty rates for each application dataset, and at least one capability for each resource; and
- applying at least one solution technique to the optimization problem to determine at least one recovery schedule.

8. The method of recovering data of claim 7, wherein the penalty rates are selected from: outage time penalties, recent data loss penalties, vulnerability penalties, disruption penalties, and combinations thereof.

9. The method of recovering data of claim 7, wherein the recovery graph includes paths for failed as well as non-failed application datasets.

10. The method of recovering data of claim 7, wherein the objective of the optimization problem is selected from the group consisting of: minimizing financial penalties, minimizing recovery time, minimizing data loss, minimizing vulnerability to subsequent failure, minimizing disruption to unaffected workloads, satisfying recovery time objectives, satisfying data loss objectives, satisfying scheduling deadlines and combinations thereof.

11. The method of recovering data of claim 7, wherein an optimized solution decomposes the problem into two parts, path selection and schedule determination, each having an applied solution technique.

12. The method of recovering data of claim 7, wherein providing the recovery graph includes:
- determining application workloads in a system environment;
- determining resources within the environment and their capabilities;
- determining data protection and recovery techniques available for each application;
- determining steps for each recovery strategy, including for each step the resource demands and ordering constraints; and
- assembling the recovery graph from the determined resources, application workloads, data protection and recovery techniques, recovery strategy steps and a disaster scenario.

13. The method of recovering data of claim 7, wherein formalizing the recovery graph into an problem includes:
- determining precedence constraints for the recovery of each application dataset and reinstatement of data protection workloads for each application dataset;
- determining resource constraints, where the sum of the demands for a resource under a candidate schedule can not exceed the capabilities of the resource.

14. The method of recovering data of claim 7, wherein the application dataset includes application binaries, application metadata and user data.

15. A method for determining a recovery schedule for recovering data, comprising:
- accepting as input a recovery graph, the recovery graph presenting one or more recovery strategies for recovering application datasets, each recovery strategy represented as a path, each recovery action for each path represented as a node along each path, precedence constraints represented by directed edges between the nodes, and resource demands represented as node annotations;
- obtaining the penalty rates associated with each application dataset;
- obtaining resource demands for each recovery action for each recovery strategy for each application dataset to be recovered;
- obtaining the capabilities of resources within the environment;
- obtaining at least one objective for the recovery schedule; and
- applying at least one solution technique incorporating the recovery graph, the penalty rates and the resource demands to determine at least one recovery schedule for the objective.

16. The method of recovering data of claim 15, wherein determining the resource demands for each recovery action includes the resource demands for each failed and non-failed workload.

17. The method of recovering data of claim 15, wherein in applying the solution technique the recovery graph is formalized as an optimization problem for the objective.

18. The method of recovering data of claim 15, wherein the penalty rates are based on one or more factors selected from the group consisting of: choice of path, start time of a job, end time of a job, duration of a job, involved resources, and combinations thereof.

19. The method of recovering data of claim 15, wherein an optimized solution decomposes the problem into two parts, a first part including path selection for each workload, and a second part including schedule determination for each selected path, the first part and the second part each having an applied solution technique.

20. The method of recovering data of claim 15, wherein the method is stored on a computer-readable medium as a computer program which, when executed by a computer will perform the steps of determining at least one recovery schedule.

* * * * *

UNITED STATES PATENT AND TRADEMARK OFFICE
CERTIFICATE OF CORRECTION

PATENT NO.        : 7,426,616 B2                                        Page 1 of 1
APPLICATION NO.   : 11/508102
DATED             : September 16, 2008
INVENTOR(S)       : Kimberly Keeton et al.

It is certified that error appears in the above-identified patent and that said Letters Patent is hereby corrected as shown below:

In column 12, line 30, delete "PR-PRS" and insert -- RP-PRS --, therefor.

Signed and Sealed this

Twenty-eighth Day of April, 2009

JOHN DOLL
*Acting Director of the United States Patent and Trademark Office*